UNITED STATES PATENT OFFICE.

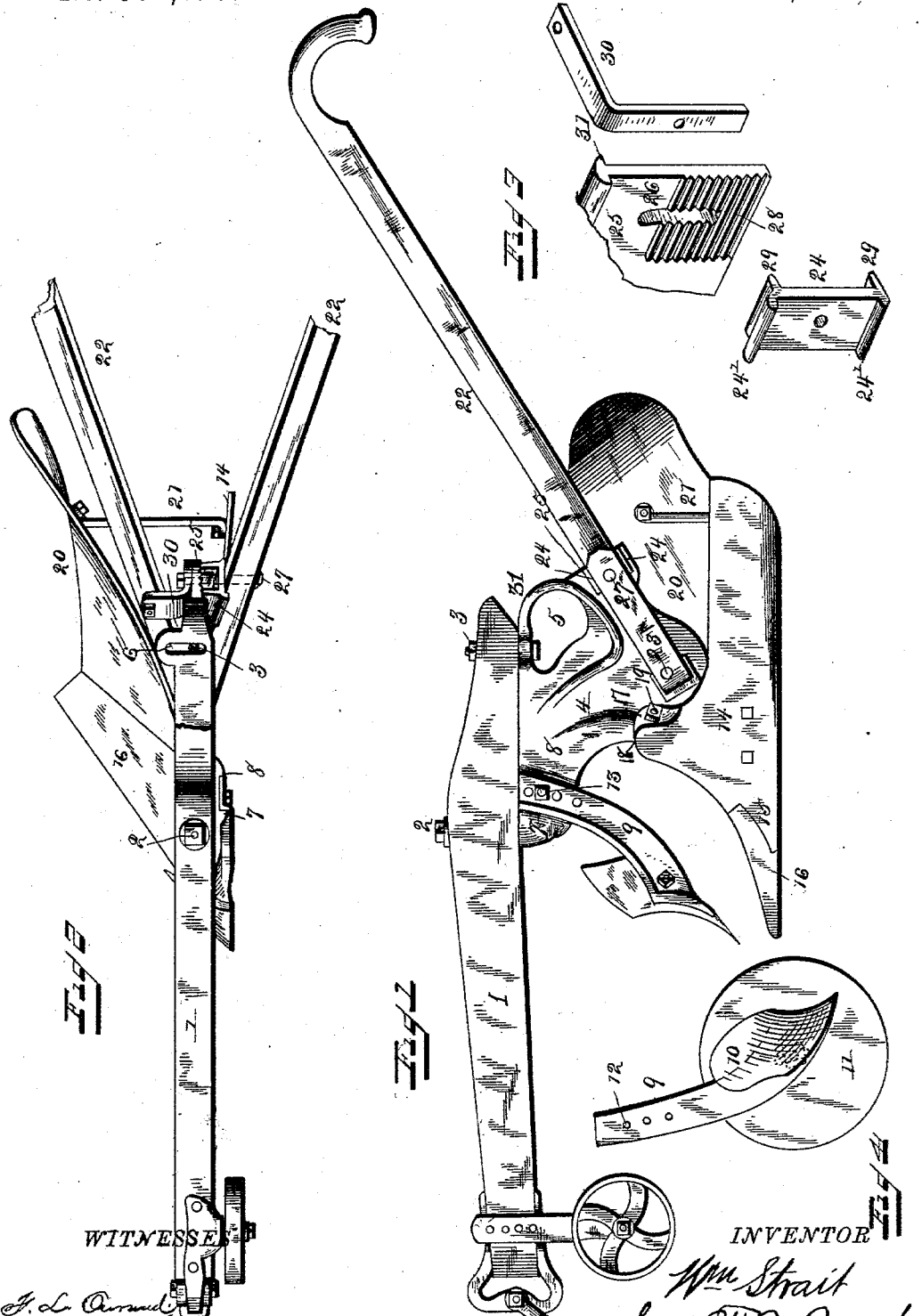

WILLIAM STRAIT, OF ELMIRA, NEW YORK.

PLOW.

SPECIFICATION forming part of Letters Patent No. 561,625, dated June 9, 1896.

Application filed April 25, 1888. Serial No. 271,796. (No model.)

*To all whom it may concern:*

Be it known that I, WILLIAM STRAIT, a citizen of the United States, residing at Elmira, in the county of Chemung and State of New York, have invented certain new and useful Improvements in Plows; and I do declare the following to be a full, clear, and exact description of the invention, such as will enable others skilled in the art to which it appertains to make and use the same, reference being had to the accompanying drawings, and to the figures of reference marked thereon, which form a part of this specification.

Figure 1 is a side elevation of a plow embodying my improvements. Fig. 2 is a top plan view of the same having the rear portion of the beam and the handles broken away to show more clearly the construction. Fig. 3 represents perspective detached views, which will be hereinafter referred to. Fig. 4 represents a side elevation of a combined colter and jointer which I may use upon plows of this class.

The object of my invention will be now particularly set forth, and the construction and combination of parts which are believed to be new will then be pointed out in the claims.

1 represents the plow-beam.

2 is a bolt upon which the beam is pivoted so as to have a limited lateral movement thereon.

3 represents a bolt passing through the rear of the beam 1.

4 is the plow-standard.

5 is an opening formed in the rear of the standard, and 6 is a transverse slot formed in the standard, within which the bolt 3 and beam 1 are adjustably set and bolted firmly in place.

The opening 5 is preferably cast in the standard and permits access to the bolt 3 on the under side for the purpose of adjusting the plow-beam.

7 is the forwardly-projecting portion of the standard. It is provided with a jointer or colter seat having side ribs 8 to hold the jointer or colter arm 9 in place.

9 is the colter or jointer arm, to which the jointer 10 or colter 11, or both, may be attached.

12 are a series of holes, and 13 a bolt for adjustably setting arm 9 at any desired practical height.

In Fig. 4 I show a combined jointer and colter, which I find is desirable upon some kinds of land to be plowed. In this combined colter 10 represents the jointer, which is shaped similarly to a miniature moldboard, so as to throw the material to one side. The colter 11 is a rotary disk having a knife-edge, and it may be adjustably bolted to the arm 9. The inner edge of the jointer is in close proximity to and parallel with the sides of the disk colter.

In the operation of the colter and jointer the office of the colter is to cut in two all loose material upon the surface—such as cornstalks, roots, and the like—and also to open or cut a shallow incision in the ground. The point of the jointer also runs just below the surface and behind the colter, and it acts to turn over and throw to one side the roots, grass, or other matter, so that the subsequent passage of the moldboard or plow will completely turn such matter under the ground.

14 is the landside of the plow.

15 is an angular joint between the point 16 and the landside. The landside is formed with a forwardly upwardly projection 17, to which the oblique inwardly-extending lug 18 is formed. 19 is a bolt passing through said lug and through the standard for securing the landside.

The front edge of the landside forms the cutting edge of the plow.

20 is the moldboard, and 21 a brace connecting the landside and moldboard.

22 are the handles. They are adjustable in height.

23 is the pivotal bolt upon which the handles swing.

24 is a casting which rests against the inner side of one of the handles. 24' are flanges thereon which prevent the casting being moved out of place.

25 is the rear end of the standard. 26 is a slot therein which permits the set-bolt 27 to play therein. 28 are corrugations formed on the side of the part 25, into which the teeth 29 of the casting 24 are adjustably set.

30 is an angle-iron, one end of which is bolted to the handle and the other to the side of the rear standard 25, opposite the corrugations 28. The set-bolt 27 passes through the angle-iron, the rear of the standard, casting 24, and one handle 22.

The teeth 29 are so set and bolted to the corrugations 28 that the handles may be set at any practical height. The flanges 31 on the portion 25 prevent the handles rising beyond that point.

By attaching the jointer or colter to the plow-standard itself instead of to the beam gives increased rigidity to the connection and prevents any shifting of their position when it is desired to make the beam laterally adjustable.

A fixed colter may be combined with the jointer in the place of the rotary colter.

31 is a brace cast with the standard and projecting in the rear of the recess 5. It serves to strengthen the standard at that point.

I claim—

1. In a plow, a standard having a forwardly-projecting part provided with a seat for a jointer or colter, a side opening in the rear thereof provided with a strengthening-rib above and in the rear of said opening, a transverse slot at the top of the opening to receive a bolt and permit of lateral adjustment of the beam, and a rear toothed projection provided with a slot therein, substantially as set forth.

2. A plow-standard having a forward projection provided with a colter or jointer seat, an opening in the rear end of the standard, a transverse slot in the top of the standard communicating with said opening, a bolt passing through said slot and through the beam to permit of lateral adjustment, the beam and standard being pivotally connected, a toothed rear extension having a slot therein, and a rib formed above and around said opening.

3. A plow-standard having a forward projection provided with a colter or jointer seat, an opening in the rear end of the standard, a transverse slot in the top of the standard communicating with said opening, a toothed rear extension having a slot therein, in combination with a detachable toothed piece interposed between the handles and the rear extension, said toothed piece having teeth on one side and flanges on the other, and the plow-handles.

In testimony whereof I affix my signature in presence of two witnesses.

WM. STRAIT.

Witnesses:
 J. C. STODDARD,
 CHAS. A. CLEMENTS.